United States Patent
Takasu et al.

[15] 3,665,015
[45] May 23, 1972

[54] PROCESS FOR PREPARING 3-HYDROXY-2-METHYL-4-PYRONE

[72] Inventors: Itaru Takasu; Masaru Higuchi; Hiroshi Hotta, all of Ohimachi, Japan

[73] Assignee: Daicel Ltd., Osaka, Japan

[22] Filed: Oct. 6, 1969

[21] Appl. No.: 864,166

[30] Foreign Application Priority Data

Oct. 12, 1968 Japan...................................43/74342
Oct. 12, 1968 Japan...................................43/74343

[52] U.S. Cl.........................260/345.9, 260/594, 260/488 F
[51] Int. Cl. .........................................................C07d 7/16
[58] Field of Search..............................................260/345.9

[56] References Cited

FOREIGN PATENTS OR APPLICATIONS

43/14,706   6/1968   Japan..................................260/345.9

OTHER PUBLICATIONS

Cavalieri, L. F., Chem. Reviews (1947) p. 529
Letzinger, R. L. et al., Jour. Am. Chem. Soc., Vol. 83 (1961) pp. 193–198
Sagredos, A. N. et al., Justus Liebigs Am. Chem. Vol. 697, (1966) pp. 111–115

*Primary Examiner*—Norma Milestone
*Attorney*—Woodhams, Blanchard & Flynn

[57] ABSTRACT

3-hydroxy-2-methyl-4-pyrone (maltol) is prepared by (1) reacting $\beta$, $\delta$-dioxocaproaldehyde dialkyl acetal with lead tetraacetate, (2) either (a) pyrolyzing the product of step (1), or (b) treating the same with an acid condensing agent, and (3) hydrolyzing the product of step (2) either simultaneously therewith or subsequently.

$\beta$, $\delta$-dioxocaproaldehyde is prepared by reacting lower alkyl $\beta\beta$-dialkoxypropionates with acetone under conditions suitable to effect the Claisen condensation reaction.

6 Claims, No Drawings

PROCESS FOR PREPARING 3-HYDROXY-2-METHYL-4-PYRONE

The present invention relates to a process for preparing 3-hydroxy-2-methyl-4-pyrone (maltol) which comprises (1) reacting β, δ-dioxocaproaldehyde dialkyl acetal represented by the general formula:

$$(R^1O)_2CHCH_2COCH_2COCH_3$$

(wherein $R^1$ represents a lower alkyl group having from one to four carbon atoms) with lead tetraacetate, (2) either pyrolyzing the resultant oxidatively acetoxylated product or treating the same with an acid condensing agent and (3) hydrolyzing the product of step (2) either subsequently or simultaneously with step (2).

The basic route of the reaction in this invention is represented by the following scheme:

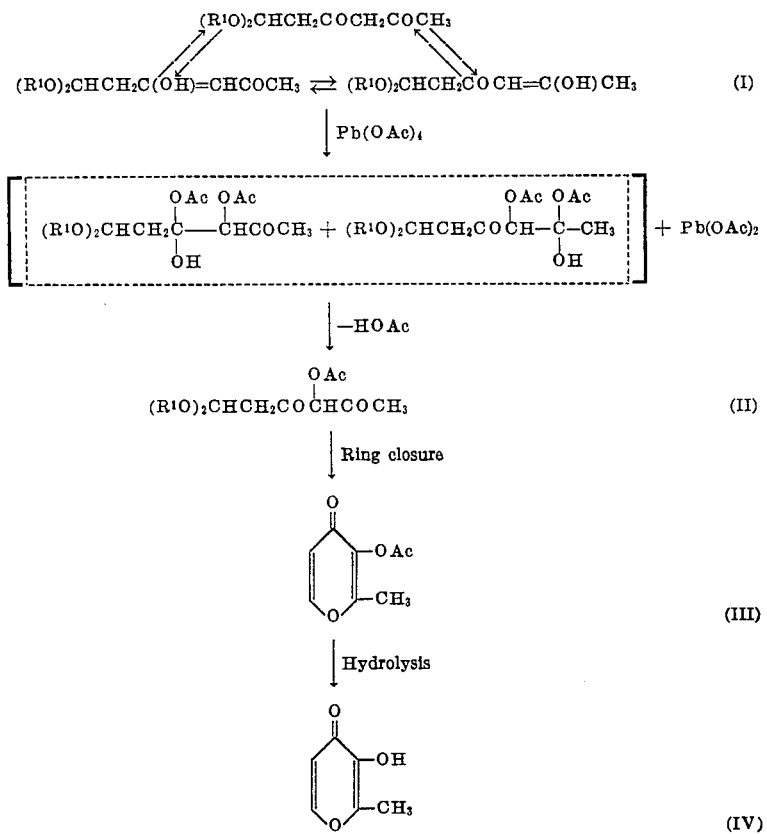

wherein $R^1$ represents a lower alkyl group having one to four carbon atoms and Ac represents an acetyl group. The formulae encompassed by the dotted line are transients which are believed to be formed and they are shown to aid in understanding the reaction mechanism. However, it will be understood that the invention is not limited to the correctness of this belief.

The above β, δ-dioxocaproaldehyde dialkyl acetals (I) are novel compounds and can be prepared in good yield, for instance, by reacting lower alkyl β, β-dialkoxypropionates represented by the general formula:

$$(R^1O)_2CHCH_2COOR^2$$

(wherein $R^1$ is the same alkyl group referred to above and $R^1$ and $R^2$ represent identical or different lower alkyl groups each having one to four carbon atoms respectively) with acetone under conditions suitable for effecting the Claisen condensation reaction.

This reaction can be represented by the following general formula:

$$(R^1O)_2CHCH_2COOR^2 + CH_3COCH_3 \rightarrow (R^1O)_2CHCH_2COCH_2COCH_3 + R^2OH \quad (I)$$

Said lower alkyl β, β-dialkoxypropionates having the general formula $(R^1O)_2CHCH_2COOR^2$, in which $R^1$ and $R^2$ are methyl or ethyl groups, together with their preparation methods, are already known. For example, they can readily be prepared by the reaction between acetic esters and formic esters under the conditions of the Claisen condensation reaction, followed by the preparation of acetals catalyzed by strong acid catalyst with an adequate alkanol from the resulting formyl derivatives, or by the reaction between orthoformic esters and bromoacetic esters by using zinc.

The Claisen condensation reaction for preparing said compounds (I) from acetone and lower alkyl β, β-dialkoxypropionates, in which the lower alkyl is preferably methyl or ethyl, is carried out in the presence of a basic condensing agent. As the basic condensing agent, metallic sodium, sodium methoxide and sodium ethoxide are preferred, but other basic condensing agents, such as sodium amide and sodium hydride, can also be employed. As the reaction medium, it is recommended to use an anhydrous lower alkanol or other relatively lower-boiling inert solvent such as diethyl ether and benzene. The amounts, mole ratios and method of mixing the reactants, the solvent and the basic condensing agent are not critical and they can be appropriately selected so that the β, δ-dioxocaproaldehyde dialkyl acetal can be obtained economically. The reaction temperature is usually selected within the range of $-10°$–$80°$ C., but this is not critical. After the reaction, the basic components in the system should be carefully neutralized with an acid neutralizing agent such as formic, acetic, hydrochloric, phosphoric or sulfuric acid, with care being taken to avoid making the system too acidic, thus obtaining β, δ-dioxocaproaldehyde dialkyl acetal.

These compounds (I) are novel as already mentioned and exist as the keto-enol tautomers. They include β, δ-dioxocaproaldehyde dimethyl acetal and diethyl acetal, which are chelating agents themselves and which can also be used as intermediates for synthesizing useful organic compounds such as maltol (3-hydroxy-2-methyl-4-pyrone) according to the present invention.

The reaction of this invention for obtaining 3-hydroxy-2-methyl-4-pyrone is carried out by reacting β, δ-dioxocaproaldehyde dialkyl acetal (I) existing as a mixture of the keto-enol tautomers as shown in the above scheme, with lead tetraacetate in an appropriate solvent, such as benzene, methanol or acetic acid, and at a temperature, preferably from 0° C. to the reflux temperature of the solvent used, to effect oxidative acetoxylation of said acetal. The resultant acetoxylated product substantially consisting of γ-acetoxy-β, δ-dioxocaproaldehyde dialkyl acetal (possibly existing as a mixture of tautomers) (II) is either (a) pyrolyzed at a temperature of more than about 150° C. and preferably less than about 300° C. or (b) treated with an acid condensing agent, such as hydrochloric, phosphoric, sulfuric or an organic sulfonic acid, such as p-toluene sulfonic acid, at a temperature of about 0° to 300° C., preferably less than 100° C. The resultant 3-acetoxy-2-methyl-4-pyrone (III) is hydrolyzed to give 3-hydroxy-2-methyl-4-pyrone (IV).

The ring closure by means of pyrolysis can be effected simultaneously when the acetoxylated product is distilled under reduced pressure by heating at the above-mentioned temperature. Since the compound (III) can be rather readily hydrolyzed, the hydrolysis can occur under the presence of water in the reaction system simultaneously in said pyrolysis step or in said treatment with an acid condensing agent. Thus, it is possible to make the desired end product (IV) by one step from the acetoxylated product (II).

The amounts, mole ratios and method of mixing the concerned materials is not critical and can be suitably selected so that the desired end product (IV) can be obtained economically.

Lead acetate, which is another product in the oxidative acetoxylation step, will precipitate in most cases as virtually insoluble crystals in the system, which is either the reaction mixture or the reaction mixture after the solvent has been removed by evaporation. The lead acetate can be recovered almost quantitatively by only filtering the system. When the recovered lead acetate is oxidized or oxidatively acetoxylated to lead tetraacetate in the conventional manner, such as by using chlorine as an oxidizing agent, it can be reused effectively.

The desired end product (IV) of this invention is commonly known as maltol. Maltol is useful as a fragrance ingredient, especially as a flavor enhancer for foods. The object of this invention is to provide a novel process for synthesizing maltol which has so far been derived from biochemical sources alone.

The following Example A and B show preferred procedures of preparing β, δ-dioxocaproaldehyde dialkyl acetals (I) according to this invention.

EXAMPLE A

To a mixture of 360 parts by weight of dry diethyl ether (parts(s) by weight will be referred to as "part(s)" hereinafter) and 23 parts of finely granulated metallic sodium, there was gradually added a mixture of acetone (58 parts) and methyl β, β-dimethoxypropionate (148 parts) at the reflux temperature of diethyl ether. After finishing the addition, the resultant mixture was reacted at 5° to 10° C. for about 2 hours. The reaction mixture was then neutralized with an aqueous sulfuric acid solution until it became weakly acidic. The organic layer was separated and evaporated to remove the solvent. The residue was distilled in vacuo to give β, δ-dioxocaproaldehyde dimethyl acetal (88 parts) showing a boiling temperature of 75°–76° C. per 3 mm. Hg. According to IR absorption spectrum, NMR spectrum, chemical behaviors and results of elemental analysis as shown below on the crystalline cuprous salt of blue color (melting point: 159°–160° C.) produced by mixing and agitating the product of this reaction with a saturated aqueous solution of cuprous acetate, it was confirmed that the product of this reaction was β, δ-dioxacaproaldehyde dimethyl acetal.

Elemental analysis of cuprous salt: $(C_8H_{13}O_4)_2Cu$
Calculated: C 46.88% H 6.39%
Found: C 46.99% H 6.40%

It was found that the greater part of this compound existed in the enol-form in a carbon tetrachloride solution at room temperature. This material was used in the following Examples 1 and 2.

EXAMPLE B

To a mixture of dry diethyl ether (180 parts) and sodium methoxide (32 parts), there was added gradually dropwise a mixture of acetone (29 parts) and ethyl β, β-diethoxypropionates (95 parts) at the reflux temperature of diethyl ether. After finishing the addition, the reaction mixture was treated in a similar way as mentioned in Example A to obtain β,δ-dioxocaproaldehyde diethyl acetal (46 parts) showing a boiling temperature of 97°–99° C. per 4 mm. Hg. According to IR and NMR spectra, chemical behaviors and results of elemental analysis as shown below, similar to Example A, it was confirmed that the product of this reaction was β, δ-dioxocaproaldehyde diethyl acetal.

Elemental analysis of cuprous salt: $(C_{10}H_{17}O_4)_2Cu$
Calculated: C 51.55% H 7.35%
Found: C 50.85% H 7.32%

This material was used in the following Example 3.

The following Examples 1 to 3 show preferred and practical embodiments of the process according to the present invention for preparing 3-hydroxy-2-methyl-4-pyrone.

EXAMPLE 1

(1) To a mixture of lead tetraacetate (116 parts) and dry benzene (132 parts), there was added dropwise β, δ-dioxocaproaldehyde dimethyl acetal (41 parts), and the resultant mixture was reacted at 30° to 35° C. for 2 hours. The precipitated lead acetate was filtered off. The filtrate was evaporated to remove the solvent and the residue was distilled in vacuo to give a distillate consisting mainly of γ-acetoxy-β,δ-dioxocaproaldehyde dimethyl acetal. The boiling point was 99° to 105° C. per 3 mm. Hg.

(2) The thus obtained distillate (10 parts) was mixed with benzene (26 parts) and concentrated sulfuric acid (1 part); and the resultant mixture was stirred at 50° to 55° C. for 2 hours. The benzene layer was separated and washed with water. The sulfuric acid layer was combined with the aqueous washings, neutralized with 15 percent sodium hydroxide solution and shaken with chloroform. The chloroform layer was evaporated to remove the solvent and crude crystals of 3-hydroxy-2-methyl-4-pyrone were precipitated. Separately, the benzene layer was evaporated to remove the solvent and a residue containing some crystals and liquid was obtained. The residue was hydrolyzed with concentrated hydrochloric acid, neutralized and shaken with chloroform. The chloroform layer was evaporated to remove the solvent and crude crystals of 3-hydroxy-2-methyl-4-pyrone were obtained. The total amount of crystals obtained amounted to about 3 parts. The purified product showed a melting point of 162° to 163° C. No lowering of the melting point was observed when the purified product was admixed with an authentic sample of maltol. The IR and NMR spectra of the purified product were quite in accordance with those of the authentic maltol sample. The purified product was subjected to a coloring test with ferric chloride and the result was positive.

Elemental analysis for $C_6H_6O_3$:
Calculated: C 57.14% H 4.80% O 38.06%
Found: C 57.32% H 4.89% O 37.79%

EXAMPLE 2

(1) To a mixture of β, δ-dioxocaproaldehyde dimethyl acetal (9.2 parts) and glacial acetic acid (105.0 parts), there was added lead tetraacetate (26.0 parts), and the resultant mixture was reacted at 20° to 25° C. for 4 hours. The reaction mixture was evaporated to remove acetic acid and the precipitated lead acetate was filtered off. The filtrate was distilled in vacuo at 150° to 160° C. (bath temperature) to give a distillate (5.5 parts) consisting mainly of 3-acetoxy-2-methyl-4-pyrone. The boiling point was 110° to 120° C. per 3 mm. Hg.

(2) To the thus obtained distillate (4.6 parts), there was added concentrated hydrochloric acid (10.0 parts). The mixture was stirred at room temperature for 2 hours and then was stirred at 50° to 55° C. for 1 hour. The reaction mixture was neutralized with about 15 percent sodium hydroxide solution and shaken with chloroform. The chloroform layer was evaporated to give 3-hydroxy-2-methyl-4-pyrone (1.8 parts) as crude crystals. The sublimed product showed a melting point of 162° to 163° C. and no lowering of the melting point was observed when it was admixed with an authentic sample of maltol. The IR and NMR spectra of this substance were in accordance with those of the authentic maltol sample. The result of the ferric chloride test was positive.

EXAMPLE 3

To a mixture of β, δ-dioxocaproaldehyde diethyl acetal (25 parts) and benzene (71 parts), there was added lead tetraacetate (50 parts) and the mixture was reacted at 35° to 40° C. for 2 hours. The precipitated lead acetate was filtered off under suction. The filtrate was concentrated and the remaining liquid was pyrolyzed at 150° to 155° C. per 4 mm. Hg. to give 3-hydroxy-2-methyl-4-pyrone as the sublimed product. This substance showed a melting point of 162° to 163° C., and no lowering of the melting point was observed when this substance was admixed with an authentic sample of maltol. IR spectrum of this product was in accordance with that of the authentic maltol sample.

The embodiments of the invention in which an exclusive property or privilege is claimed are defined as follows:

1. Process for preparing 3-hydroxy-2-methyl-4-pyrone which comprises (1) reacting β, δ-dioxocaproaldehyde dialkyl acetal of the formula:

$$(R^1O)_2CHCH_2COCH_2COCH_3$$

wherein $R^1$ is a lower alkyl group having from one to four carbon atoms, with lead tetraacetate, (2) subjecting the resultant oxidatively acetoxylated product to a ring closing reaction by either (a) pyrolyzing the resultant oxidatively acetoxylated product, or (b) treating the same with an acid condensing agent and (3) hydrolyzing the product of step (2) either subsequently or simultaneously to obtain 3-hydroxy-2-methyl-4-pyrone.

2. A process as claimed in claim 1, in which said lower alkyl group is selected from the group consisting of ethyl and methyl.

3. A process as claimed in claim 1, in which said oxidatively acetoxylated product is pyrolyzed at a temperature of more than 150° C.

4. Process for preparing 3-hydroxy-2-methyl-4pyrone which comprises (1) reacting (a) lower alkyl β, β-dialkoxypropionate of the formula:

$$(R^1O)_2CHCH_2COOR^2$$

wherein $R^1$ and $R^2$ are identical or different lower alkyl groups each having from one to four carbon atoms respectively, with (b) acetone, in the presence of (c) a basic condensing agent and (d) an inert solvent and then (2) neutralizing the reaction mixture to obtain β, δ-dioxocaproaldehyde dialkyl acetal of the formula:

$$(R^1O)_2CHCH_2COCH_2COCH_3$$

wherein $R^1$ has the same meaning as given above, (3) reacting said β, δ-dioxocaproaldehyde dialkyl acetal with lead tetraacetate, (4) subjecting the resultant oxidatively acetoxylated product to a ring closing reaction by either (a) pyrolyzing the resultant oxidatively acetoxylated product or (b) treating the same with an acid condensing agent and (5) hydrolyzing the product of step (4) either subsequently or simultaneously to obtain 3-hydroxy-2-methyl-4-pyrone.

5. The process as claimed in claim 4, in which said lower alkyl group is selected from the group consisting of ethyl and methyl.

6. The process as claimed in claim 4, in which said lower alkyl β, β-dialkoxypropionate is reacted with acetone at a temperature in the range of from about −10° C. to about 80° C.

* * * * *